United States Patent
Parekh et al.

(10) Patent No.: US 8,457,075 B2
(45) Date of Patent: *Jun. 4, 2013

(54) TUNE-AWAY PROTOCOLS FOR WIRELESS SYSTEMS

(75) Inventors: Nileshkumar Jayendrabhai Parekh, San Diego, CA (US); Fatih Ulupinar, San Diego, CA (US); Rajat Prakash, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/417,838

(22) Filed: Mar. 12, 2012

(65) Prior Publication Data

US 2012/0172035 A1 Jul. 5, 2012

Related U.S. Application Data

(63) Continuation of application No. 11/261,803, filed on Oct. 27, 2005, now Pat. No. 8,134,977.

(51) Int. Cl.
*H04W 4/00* (2009.01)
*H04W 36/00* (2009.01)
*H04W 72/00* (2009.01)

(52) U.S. Cl.
USPC ........ 370/332; 455/436; 455/451; 455/435.2; 455/434; 370/329

(58) Field of Classification Search
USPC .................................. 370/331, 332; 455/436
See application file for complete search history.

(56) References Cited

U.S. PATENT DOCUMENTS

| 5,260,943 A | 11/1993 | Comroe et al. |
| 5,533,014 A | 7/1996 | Willars et al. |
| 5,640,679 A | 6/1997 | Lundqvist et al. |
| 5,828,659 A | 10/1998 | Teder et al. |
| 6,067,442 A | 5/2000 | Wiedeman et al. |
| 6,069,880 A | 5/2000 | Owen et al. |
| 6,072,847 A | 6/2000 | Dupuy et al. |
| 6,097,709 A | 8/2000 | Kuwabara |

(Continued)

FOREIGN PATENT DOCUMENTS

| CL | 29032006 | 5/2007 |
| CL | 29062006 | 5/2007 |

(Continued)

OTHER PUBLICATIONS

3GPP TR 25.922 v.6.0.1: 3rd Generation Partnership Project; Technical Specification Group Radio Access Network; Radio resource management strategies (Release 6) (Apr. 2004) pp. 15-31.

(Continued)

*Primary Examiner* — Allahyar Kasraian
(74) *Attorney, Agent, or Firm* — Donald C. Kordich

(57) ABSTRACT

Systems and methods are provided for processing wireless signal components for a mobile wireless access broadband service. This can include processes for defining a protocol that controls whether to invoke a tune away component to determine an alternative wireless communications path. This can include defining one or more tune away parameters for the tune away component. The process can then automatically select the alternative wireless communications path based in part on the tune away procedure and at least one of the tune away parameters.

13 Claims, 12 Drawing Sheets

U.S. PATENT DOCUMENTS

| | | |
|---|---|---|
| 6,119,005 A | 9/2000 | Smolik |
| 6,122,270 A | 9/2000 | Whinnett et al. |
| 6,157,845 A | 12/2000 | Henry et al. |
| 6,181,943 B1 | 1/2001 | Kuo et al. |
| 6,195,551 B1 | 2/2001 | Kim et al. |
| 6,246,673 B1 | 6/2001 | Tiedemann, Jr. et al. |
| 6,282,420 B1 | 8/2001 | Bamburak et al. |
| 6,331,971 B1 | 12/2001 | Raith |
| 6,400,952 B2 | 6/2002 | Kim et al. |
| 6,465,803 B1 | 10/2002 | Bowers et al. |
| 6,466,803 B1 | 10/2002 | Gardner |
| 6,498,933 B1 | 12/2002 | Park et al. |
| 6,510,146 B1 | 1/2003 | Korpela et al. |
| 6,522,670 B1 | 2/2003 | Jokinen et al. |
| 6,563,807 B1 | 5/2003 | Kim et al. |
| 6,584,318 B2 | 6/2003 | Hakalin et al. |
| 6,603,751 B1 | 8/2003 | Odenwalder |
| 6,608,818 B1 | 8/2003 | Abrol et al. |
| 6,614,769 B1 | 9/2003 | Erlick et al. |
| 6,665,281 B1 | 12/2003 | Kim |
| 6,668,170 B2 | 12/2003 | Costa et al. |
| 6,810,019 B2 | 10/2004 | Steudle |
| 6,822,948 B2 | 11/2004 | Bergstrom et al. |
| 6,829,481 B2 | 12/2004 | Souissi |
| 6,845,238 B1 | 1/2005 | Muller |
| 6,891,812 B2 | 5/2005 | Bender |
| 6,934,526 B2 | 8/2005 | Choi et al. |
| 6,959,201 B2 | 10/2005 | Leprieur et al. |
| 6,999,765 B2 | 2/2006 | Hokao |
| 7,003,290 B1 | 2/2006 | Salonaho et al. |
| 7,020,108 B2 | 3/2006 | Virtanen |
| 7,024,194 B1 | 4/2006 | Oksanen |
| 7,089,004 B2 | 8/2006 | Jeong et al. |
| 7,110,766 B1 | 9/2006 | Tayloe et al. |
| 7,133,702 B2 | 11/2006 | Amerga et al. |
| 7,151,756 B1 | 12/2006 | Park et al. |
| 7,324,479 B2 | 1/2008 | Hur |
| 7,336,951 B2 | 2/2008 | Choi et al. |
| 7,340,251 B1 | 3/2008 | McClure |
| 7,363,039 B2 | 4/2008 | Laroia et al. |
| 7,367,424 B2 | 5/2008 | Brown et al. |
| 7,379,440 B2 | 5/2008 | Gopal |
| 7,382,750 B2 | 6/2008 | Wu |
| 7,409,214 B2 | 8/2008 | Lee |
| 7,415,272 B2 | 8/2008 | Khushu et al. |
| 8,064,405 B2 * | 11/2011 | Parekh et al. .............. 370/332 |
| 8,068,835 B2 * | 11/2011 | Parekh et al. .............. 455/436 |
| 8,155,652 B2 * | 4/2012 | Parekh et al. .............. 455/436 |
| 2002/0003784 A1 | 1/2002 | Okabe et al. |
| 2002/0019231 A1 | 2/2002 | Palenius et al. |
| 2002/0187804 A1 | 12/2002 | Narasimha et al. |
| 2003/0095513 A1 | 5/2003 | Woodmansee et al. |
| 2003/0152049 A1 | 8/2003 | Turner |
| 2003/0218995 A1 | 11/2003 | Kim et al. |
| 2003/0227946 A1 | 12/2003 | Schwarz et al. |
| 2004/0053614 A1* | 3/2004 | Il-Gyu et al. .............. 455/436 |
| 2004/0208140 A1 | 10/2004 | Noguchi et al. |
| 2004/0224696 A1 | 11/2004 | Korneluk et al. |
| 2005/0054368 A1 | 3/2005 | Amerga |
| 2005/0058151 A1 | 3/2005 | Yeh |
| 2005/0073977 A1 | 4/2005 | Vanghi et al. |
| 2005/0111358 A1 | 5/2005 | Hsu et al. |
| 2005/0122922 A1 | 6/2005 | Wu et al. |
| 2005/0192011 A1 | 9/2005 | Hong et al. |
| 2005/0216580 A1 | 9/2005 | Raji et al. |
| 2005/0252262 A1 | 11/2005 | Imai et al. |
| 2005/0272403 A1 | 12/2005 | Ryu et al. |
| 2006/0062180 A1 | 3/2006 | Sayeedi et al. |
| 2006/0166676 A1 | 7/2006 | Rajkotia et al. |
| 2006/0176870 A1 | 8/2006 | Joshi et al. |
| 2006/0223557 A1 | 10/2006 | Manohar |
| 2007/0030261 A1 | 2/2007 | Sagne et al. |
| 2007/0042717 A1 | 2/2007 | Alexiou et al. |
| 2007/0097922 A1 | 5/2007 | Parekh et al. |
| 2007/0099614 A1 | 5/2007 | Parekh et al. |
| 2007/0099619 A1 | 5/2007 | Parekh et al. |
| 2007/0110022 A1 | 5/2007 | Palenius et al. |
| 2007/0218835 A1 | 9/2007 | Hindelang et al. |

FOREIGN PATENT DOCUMENTS

| | | |
|---|---|---|
| CL | 29042006 | 6/2007 |
| CL | 29082006 | 10/2007 |
| CL | 29012006 | 1/2010 |
| CL | 29072006 | 1/2010 |
| CN | 1176717 | 3/1998 |
| CN | 1324531 A | 11/2001 |
| CN | 1379963 A | 11/2002 |
| CN | 1399855 | 2/2003 |
| CN | 1400835 A | 3/2003 |
| EP | 0696147 A1 | 2/1996 |
| EP | 0948231 | 10/1999 |
| EP | 1030477 A2 | 8/2000 |
| EP | 1117268 A1 | 7/2001 |
| EP | 1467518 A1 | 10/2004 |
| EP | 1467582 A1 | 10/2004 |
| JP | 6343056 A | 12/1994 |
| JP | 10512728 | 12/1998 |
| JP | 11075237 A | 3/1999 |
| JP | 2001095031 | 4/2001 |
| JP | 2002528009 T | 8/2002 |
| JP | 2002541747 T | 12/2002 |
| JP | 2003032756 A | 1/2003 |
| JP | 2003506983 | 2/2003 |
| JP | 2003508991 T | 3/2003 |
| JP | 2004504783 | 2/2004 |
| JP | 2004282557 | 10/2004 |
| JP | 2004534412 | 11/2004 |
| JP | 2004343356 A | 12/2004 |
| JP | 2005500745 T | 1/2005 |
| JP | 2005101788 | 4/2005 |
| JP | 2005522119 T | 7/2005 |
| JP | 2005260426 A | 9/2005 |
| JP | 2005260427 A | 9/2005 |
| KR | 1020010024152 | 3/2001 |
| KR | 20010102418 | 11/2001 |
| KR | 0347415 | 7/2002 |
| KR | 1020020060391 | 7/2002 |
| RU | 2180159 | 2/2002 |
| RU | 2003125611 | 2/2005 |
| WO | WO9429981 A1 | 12/1994 |
| WO | WO9616524 | 5/1996 |
| WO | WO9623369 A1 | 8/1996 |
| WO | WO9632821 | 10/1996 |
| WO | WO9923844 | 5/1999 |
| WO | WO9943178 | 8/1999 |
| WO | WO0022837 | 4/2000 |
| WO | WO0041429 A1 | 7/2000 |
| WO | WO0060895 | 10/2000 |
| WO | WO0111914 | 2/2001 |
| WO | WO0117307 A1 | 3/2001 |
| WO | WO0120942 | 3/2001 |
| WO | WO0239758 A2 | 5/2002 |
| WO | WO03017596 A2 | 2/2003 |
| WO | WO03084253 A1 | 10/2003 |
| WO | WO2004091231 A1 | 10/2004 |

OTHER PUBLICATIONS

International Search Report—PCT/US06/060330—International Search Authority, European Patent Office—Jul. 23, 2007.
MBFDD and MBTDD Wideband Mode: Technology Overview, IEEE C802.20-05/68r1, Jan. 6, 2006.
Tomcik, J. "MBFDD and MBTDD: Technology Overview," C802.20-05/68, Internet Citation, [Online] Oct. 28, 2005, XP002422172, URL::http://www.ieee802.org/20/Contributions.html> [retrieved on Feb. 6, 2007].
Turner, S. et al.: "CDMA2000 Hybrid Access Terminal Operation White Paper," (Apr. 2001) pp. 1-25.
UMTS; Radio Resource Management Strategies, ETSI TR 25.922 V3.6.0 (Sep. 2001).
Written Opinion—PCT/US06/060330—International Search Authority, European Patent Office—Jul. 23, 2007.
Ramani et al., "SyncScan: practical fast handoff for 802.11 infrastructure networks", 24th Annual Joint Conference of the IEEE Computer and Communications Societies, INFOCOM 2005, March 2005, pp. 675-685, vol. 1, IEEE.

* cited by examiner

| Field | Length (bits) |
|---|---|
| MessageID | 8 |
| CountryCode | 12 |
| SectorID | 128 |
| SubnetMask | 8 |
| SectorSignature | 16 |
| Latitude | 22 |
| Longitude | 23 |
| RegistrationRadius | 11 |
| LeapSeconds | 8 |
| LocalTimeOffset | 11 |
| RegistrationZoneCodeIncluded | 1 |
| RegistrationZoneCode | 12 |
| RegistrationZoneMaxAge | 4 |
| GloballySynchronous | 1 |
| SynchronousWithNextPilot | 1 |
| ChannelCount | 5 |

ChannelCount occurrences of the following fields:

| Field | Length (bits) |
|---|---|
| Channel | 24 |
| NeighborCount | 5 |

NeighborCount occurrences of the following fields:

| Field | Length (bits) |
|---|---|
| NeighborPilotPN | 12 |
| CarrierID | 2 |
| SectorColor | 2 |
| TransmitPower | 6 |
| GloballySynchronous | 1 |
| SynchronousWithNextPilot | 1 |

| Field | Length (bits) |
|---|---|
| NumOtherTechnologies | 3 |

NumOtherTechnologies occurances of the following fields

| Field | Length (bits) |
|---|---|
| TechnologyType | 6 |
| TechnologyNeighborListLength | 8 |
| TechnologyNeighborList | variable |
| Reserved | 0 – 7 (as needed) |

TUNE-AWAY PROTOCOLS FOR WIRELESS SYSTEMS

CLAIM FOR PRIORITY

This application is a Continuation of U.S. patent application Ser. No. 11/261,803, filed Oct. 27, 2005 entitled "TUNE-AWAY PROTOCOLS FOR WIRELESS SYSTEMS," which is incorporated herein by reference in its entirety.

REFERENCE TO CO-PENDING APPLICATIONS FOR PATENT

The present application for patent is related to the following co-pending U.S. patent applications: U.S. patent application No. 11/260,925, entitled, "RESOURCE ALLOCATION DURING TUNE-AWAY", filed Oct. 27, 2005, assigned to the assignee hereof, and expressly incorporated by reference herein; U.S. patent application No. 11/261,804, entitled, "INTER-FREQUENCY HANDOFF", filed Oct. 27, 2005, assigned to the assignee hereof, and expressly incorporated by reference herein; U.S. patent application No. 11/261,824, entitled, "TUNE-AWAY AND CROSS PAGING SYSTEMS AND METHODS", filed Oct. 27, 2005, assigned to the assignee hereof, and expressly incorporated by reference herein; and U.S. Provisional Patent Application No. 60/731,013, entitled, "MOBILE WIRELESS ACCESS SYSTEM," filed Oct. 27, 2005, assigned to the assignee hereof, and expressly incorporated by reference herein.

BACKGROUND

I. Field

The subject technology relates generally to communications systems and methods, and more particularly to systems and methods that provide protocols that enable communications transceivers to be tuned to an alternative channel in order to determine alternative frequencies or technologies that facilitate further communications in a mobile wireless communications setting.

II. Background

Wireless companies are constantly improving next-generation networks that combine voice and data on cellular networks, for example. Collectively, these companies have spent billions on licenses and equipment to provide a broad array of new data-centric services for customers. But emerging technologies could offer a leap past so-called third-generation systems just as they are beginning to emerge. One such technology is based on the IEEE 802.20 standard, a member of the 802 family that includes the better-known 802.11b, or Wi-Fi. The Wi-Fi LAN (local area network) standard has proliferated in recent years by offering broadband wireless connections for laptops and other mobile devices.

A new standard could change the direction of wireless networking, though. Whereas Wi-Fi and the newer 802.16 metro-area wireless broadband system are limited by the range of coverage areas—from a few hundred feet to 30 miles or so, respectively whereas 802.20 sits on existing cellular towers. It essentially promises the same coverage area as a mobile phone system with the speed of a Wi-Fi connection. This may account for why 802.20, or mobile broadband wireless access (MBWA), has generated interest regarding potential new applications.

One differentiating factor for these new applications is that they provide full mobility and nationwide coverage through cell-to-cell handoff with access to broadband speeds for any application. Thus, business travelers, for example, can access corporate networks while on the move and send information in real-time back to the office—just as if they were connected to the local area network at their respective office. In some cases, users get the same broadband Internet experience they have with a DSL or cable modem connection, but in a cellular mobile environment.

One aspect for employing mobile broadband wireless access technologies is the concept of an active set and related protocol for managing communications between an access terminal such as a cell phone and an access network such as a base station. A default Active Set Management Protocol provides the procedures and messages used by the access terminal and the access point to keep track of the access terminal's approximate location and to maintain the radio link as the access terminal moves between coverage areas of different sectors. In general, the Active Set is defined as a set of Pilots or Sectors with allocated MACID for an access terminal The Active Set members can be synchronous or asynchronous with respect to each other. The access terminal can generally switch its serving Sector at any time among these Active Set member Sectors.

A Synchronous Subset of an Active Set consists of sectors that are synchronous with each other. Moreover, the subset is a maximal subset, i.e., generally all sectors that are synchronous with the sectors in this subset are contained in this subset. The different Synchronous Subsets ASSYNCH can be constructed using a last instance of an Active Set Assignment message, for example. Transmission from the access terminal to two different Synchronous Subsets of the active set is considered independent of each other. For example, the access terminal reports CQI to a Synchronous Subset of sectors independent of any other Synchronous Subset. One area that is of important concern is how communications are handed off between frequencies on a communications channel and/or between communications technologies that may be different between component of a given mobile broadband wireless access system.

SUMMARY

The following presents a simplified summary of various embodiments in order to provide a basic understanding of some aspects of the embodiments. This summary is not an extensive overview. It is not intended to identify key/critical elements or to delineate the scope of the embodiments disclosed herein. Its sole purpose is to present some concepts in a simplified form as a prelude to the more detailed description that is presented later.

Systems and methods are provided that facilitate wireless communications between wireless devices, between stations for broadcasting or receiving wireless signals, and/or combinations thereof. In one embodiment, various protocols are provided that can be employed by components such as access terminals and access nodes to determine an optimum channel for communications. The protocol enables signaling between access components that initiates automated procedures to determine if an alternative frequency and/or technology is available for use in wireless communications. The protocol may include employment of a tune-away attribute and a tune-away control message to control such aspects as tune-away duration times, tune-away periods, timing frame parameters, and whether or not to enable or disable a tune-away sequence. By employing such protocol, optimal communications channels can be selected as wireless devices are mobilized from one point to another. In one embodiment, a method is provided that includes a sector time offset to enable synchronization of tune away between nodes as an access terminal moves between different asynchronous sectors.

In another embodiment, inter-frequency and inter-radio access technology tune-away mechanisms are provided that facilitate communications in a mobile broadband wireless access system. These mechanisms are provided in a connected mode where there are on-going communications of a given channel. In general, in order to support such mobile communications applications without having to employ dual receivers for sampling and locating alternative communications paths, the tune away mechanism allows an access terminal to dynamically cooperate with an access network to determine potential communications paths to continue a particular session.

As conditions change, the tune away mechanism allows the current communications channel to be tuned to a subsequent frequency in order to determine properties of an alternative communications path such as signal strength of the path. The tune away condition provides a temporary sampling of alternative paths while mitigating disruptions to current communications. Such sampling allows determining which potential frequencies may be employed for future communications as conditions change such as when a mobile device moves from one point to another. In another embodiment, tune away may be employed to facilitate communications between differing communications technologies or protocols employed in wireless applications. For example, an existing wireless protocol may be employed for a current session but as conditions change such as movement away from one access point toward another, it may be desirable to change the actual technology or communications protocol employed to facilitate future communications. In this case, tune away is provided to support inter radio access technology (inter-RAT) applications.

To the accomplishment of the foregoing and related ends, certain illustrative embodiments are described herein in connection with the following description and the annexed drawings. These aspects are indicative of various ways in which the embodiments may be practiced, all of which are intended to be covered.

BRIEF DESCRIPTION OF THE DRAWINGS

FIG. 7 is a diagram illustrating example inter-radio access protocol parameters.

DETAILED DESCRIPTION

Systems and methods are provided for processing wireless signal components for a mobile wireless access broadband service. This can include processes for defining a protocol that controls whether to invoke a tune away component to determine an alternative wireless communications path. This can include defining a protocol that specifies one or more tune away parameters for the tune away component. The process can then automatically select the alternative wireless communications path based in part on the tune away procedure and at least one of the tune away parameters. By tuning away in this manner to determine alternative communications channels, both inter-frequency handoff applications and inter radio access technology handoffs can be achieved to support a broad range of wireless applications.

As used in this application, the terms "component," "mechanism," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate over local and/or remote processes such as in accordance with a signal having one or more data packets (e.g., data from one component interacting with another component in a local system, distributed system, and/or across a wired or wireless network such as the Internet).

Figure 1:
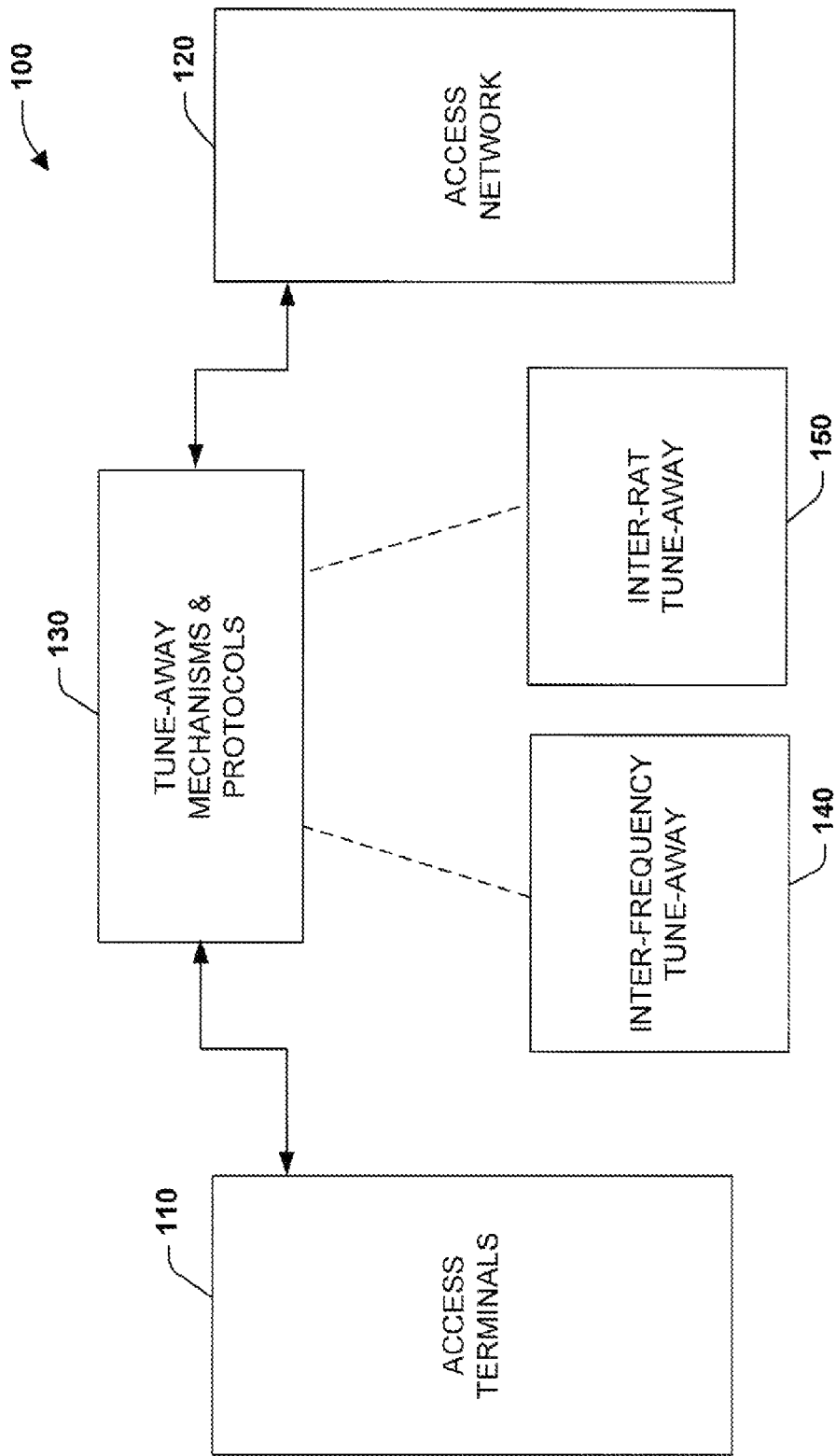
FIG. 1 is a schematic block diagram illustrating a mobile broadband wireless access system.

FIG. 1 illustrates a mobile broadband wireless access system 100. The system 100 includes one or more access terminals 110 that communicate between terminals 110 an in accordance with an access network 120, where an access network are the connections and associated electronic components that link a core network to points of presence (POP) and on to Points of Interconnect (POI) switch locations. Such terminals 110 can include substantially any type of communicating device such as a cell phone, computer, personal assistant, hand held or laptop devices, and so forth. In general, the access terminals 110 are in a mobile situation where communicating according to one particular access network 120 may not always be possible. Thus, one or more tune-away mechanisms 130 can be provided to facilitate communications between such terminals 110.

In one embodiment, various protocols are provided for the tune-away component or mechanism 130 that can be employed by components such as the access terminals 110 and the access network 120 to determine an optimum channel for communications. The protocol 130 enables signaling between the access components that initiates automated procedures to determine if an alternative frequency and/or technology is available for use in wireless communications. The protocol 130 can include employment of a tune-away attribute and a tune-away control message to control such aspects as tune-away duration times, tune-away periods, timing frame parameters, and whether or not to enable or disable a tune-away sequence. By employing such protocol 130, optimal communications channels can be automatically selected as wireless devices are mobilized from one point to another.

The tune-away mechanisms and protocols 130 basically allow the terminals 110 and network 120 to determine alternative communications paths by temporarily tuning away from an existing path and sampling a subsequent path for suitable employment in on-going communications. For example, a signal strength may be measured on an alternative frequency while tuning away from a current frequency employed for communications. If a suitable signal threshold is detected, the alternative frequency can be automatically selected for future communications. As illustrated, tune-away mechanisms can be provided to support inter-frequency tune-away applications at 140 and/or support inter radio access technology (inter-rat) applications at 150.

To facilitate inter-frequency handoff between communications channels at 140, an Active Set is extended to include members from one or more frequencies. This implies that the Active Set consists of Sectors from one or more frequencies. The Sector from different frequencies may be synchronous or asynchronous with respect to each other. To facilitate adding another frequency sector into the Active Set, the mobile broadband wireless access system 100 provides the ability for the access network 120 to specify other frequency neighbors in a sector parameters message specified in an overhead messages protocol. This includes the ability for the active terminal 110 to report other frequency Sector Pilot strength in a Pilot Report message specified in an Active Set Management Protocol. Another aspect includes the ability for access network 120 to specify other frequency members in an Active Set Assignment message specified in the Active Set Management Protocol.

Generally, in order to report other frequency Sector Pilot strength, the active terminal 110 takes measurements at various times and intervals. In an Idle mode where no on-going communications are detected, it is straight-forward since the receiver is available for other frequency measurements. In order to report Pilot strength in Connected Mode, either dual receivers or temporary tune-away mechanism 130 is provided. Since one cannot always assume availability of dual receivers, the tune-away mechanism 130 is provided to facilitate determination of alternative communications paths. Furthermore, similar tune-away mechanisms 130 are also provided for inter-RAT handoff 150 and listening for Pages for another technology that may be asynchronous to the mobile broadband wireless access (MBWA) system 100.

As noted above, the MBWA system 100 supports Idle and Connected Mode Inter-RAT Handoff. The tune-away mechanisms 130 are provided to facilitate handoff from MBWA system to other radio access technologies as well. The system design assumes that the handoff policy for Inter-RAT Handoff reside in the access terminal 110 but other architectures are possible. In other words, the trigger for measurement of other technology and the handoff decision algorithm generally reside in the access terminal 110.

For inter-rat 150 technologies, the same tune-away mechanisms can be employed as provided for the Inter-frequency handoff to measure other radio access technology Pilot signals. In addition, a Sector Parameters message in an Overhead Messages Protocol provides ability to send other technology Neighbor List. These two mechanisms provide the access terminal with the ability to find other radio access technologies in the neighborhood, and measure the Pilots for other technologies.

In another embodiment, the MBWA system 100 supports reception of Page messages for other radio access technologies. There are typically two distinct mechanisms provided although other configurations are possible. In one case, tune-away mechanism 130 receives pages for other systems. In another case, an inter RAT Protocol in a Session layer provides sending an Inter RAT Blob (binary large object) message from the access terminal 110 or the access network 120. The first case is useful when the MBWA system 100 has no integration in a core network with the other radio access technologies. Hence, one way to get a Page message from the other technology is by listening to its Paging Channel. The tune away mechanism 130 supports tuning away for listening to paging channels at very specific times in other radio access technologies that are both synchronous and asynchronous to the MBWA system 100.

In general, the tune-away mechanism 130 can be employed to sample frequencies by having timing knowledge of both the access terminals 110 and the access network 120. This can include being able to sample technologies in a manner that enables mitigating missing pages from a purely random sample since the system can determine sampling times that account for synchronous and asynchronous timing differences between terminals 110 and network 120. For example, this can include providing sampling schedules that are outside of a frequency frame or allow sampling within a sector.

Figure 2:
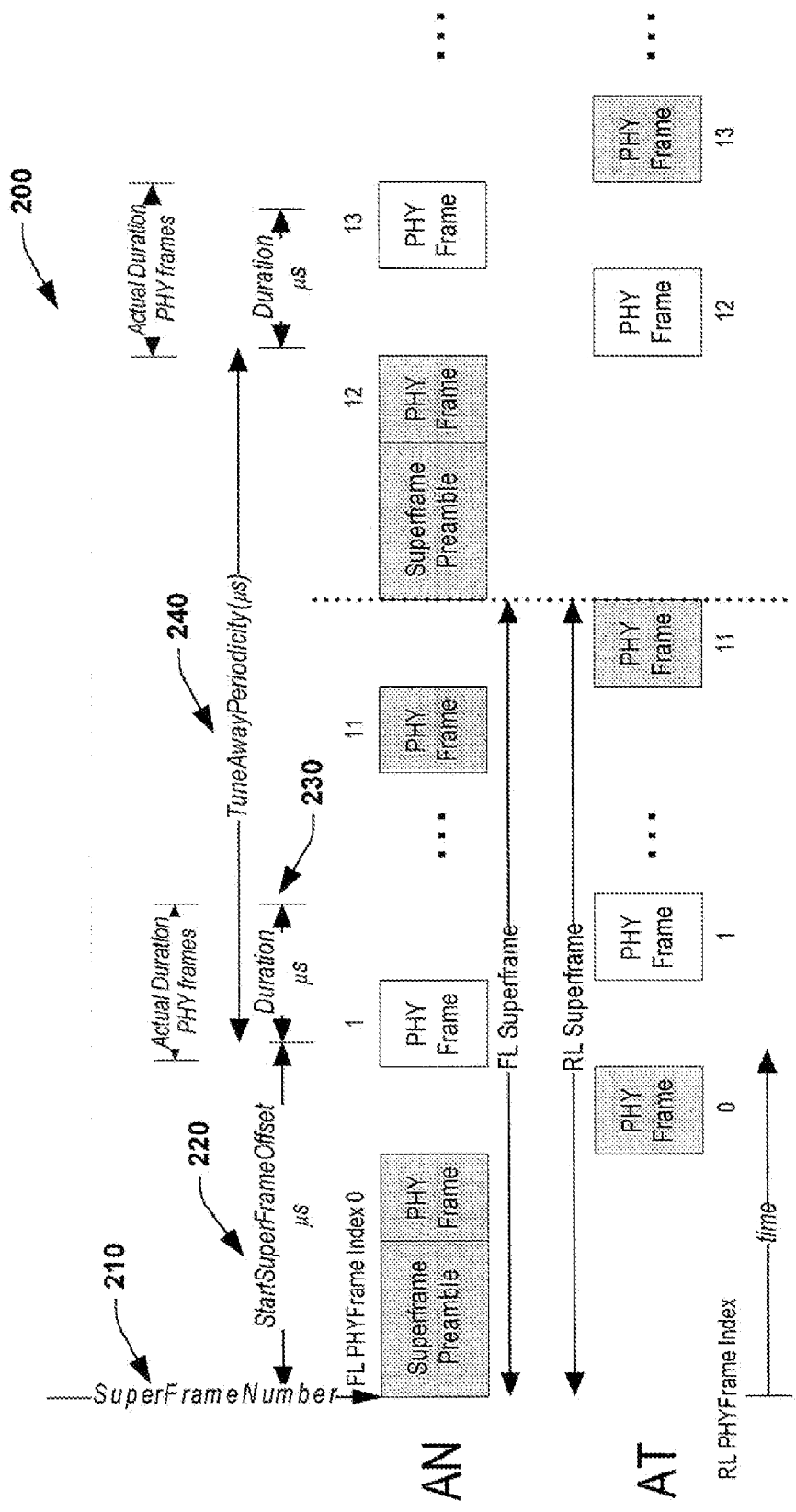
FIG. 2 is an example timing diagram for a tune-away component.

FIG. 2 illustrates an example timing diagram 200 for a tune-away component. A tune away mechanism or component generally consists of a tune away schedule and tune away control. A Tune Away Schedule N attribute parameter provides a component to communicate tune away schedule(s) between access terminals and access points or nodes. An example tune-away timing schedule is depicted in the diagram 200. In this schedule 200, it is assumed that the first tune away occurred during a Super frame defined by a Super frame Number 210 provided in a Tune Away Schedule N parameter. Furthermore, more refined time of a first tune away is a Start Super frame Offset parameter 220 e.g., microseconds from the beginning of the Super frame identified at 210. A Tune Away Duration 230 is how long in microseconds the access terminal tunes away. A Tune Away Periodicity parameter 240 determines the time between the start of successive tune away in units of microsecond. The access terminal can negotiate one or more tune away schedules if desired. More than one schedule may be needed for example to monitor pages of one system and also tuning away for inter-frequency handoffs.

The tune-away control mechanism described above provides at least two functions including: Enable/Disable tune-away, and providing time correction to the tune away schedule. The access terminal can Enable or Disable tune away schedules at substantially any time. Furthermore, the access terminal can Enable or Disable more than one schedule at the same time. The time corrections are typically provided for time critical tune-away to receive pages for a system that is asynchronous to MBWA system. In this example, whenever a new sector is added to an active set, the access terminal provides a correction factor, Sector Offset in units of microseconds to correct time so that the access terminal tunes away at the right time in the other system to receive a page. A Tune Away Request parameter and Tune Away Response messages in a Default Connected State Protocol provides a mechanism to reliably enable/disable tune-away or provide time correction for any Sector in the Active Set.

Figure 3:
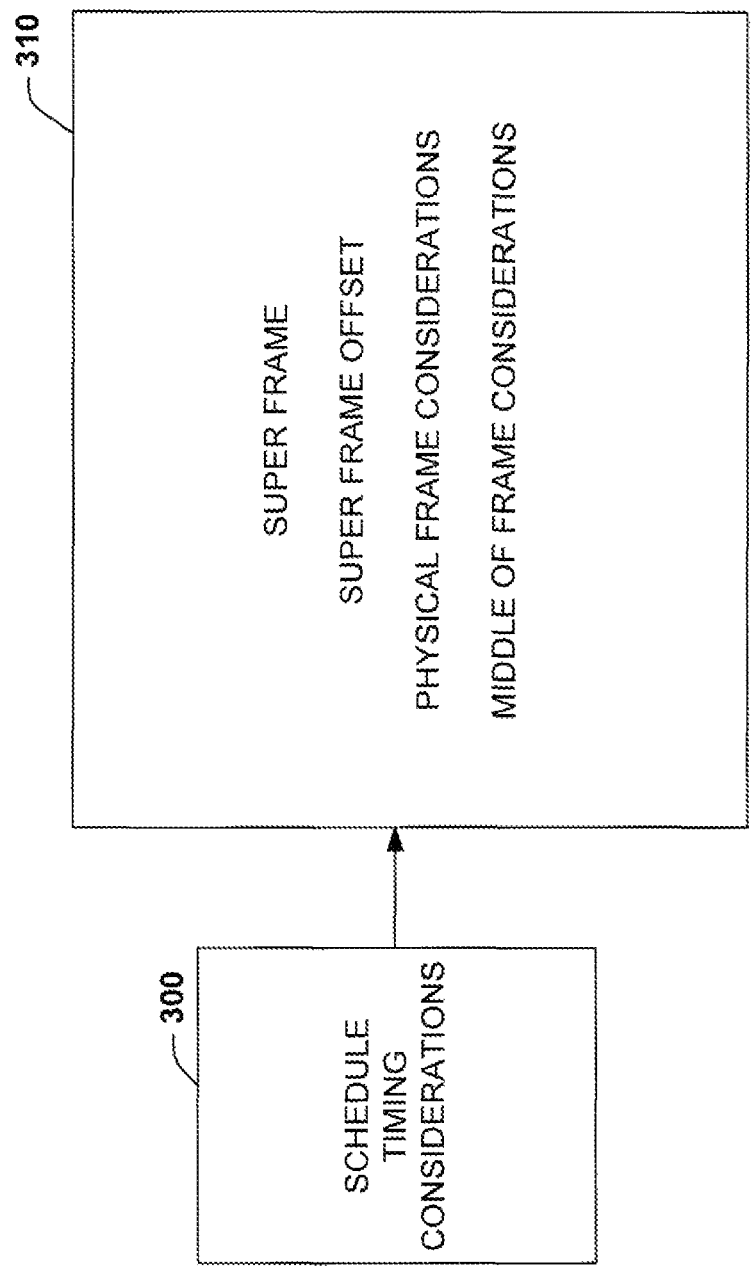
FIG. 3 is a diagram illustrating schedule timing considerations.

FIG. 3 illustrates example schedule timing considerations 300. At 310, some example schedule considerations are provided. For instance at 310, if a tune-away begins or ends in middle of a PHY Frame, a general rule is to tune away for an entire Frame. Referring briefly back to FIG. 2, a Super frame begins at 210 and basically starts with a Super frame preamble data packet followed by a series of PHY frames (e.g., 1 Super frame=1 preamble followed by 12 PHY frames). Super frame boundary considerations can include if a tune-away period causes the access terminal to miss a system information block, the access terminal shall maintain tune-away for the validity period of the system information block which can be set for different times if desired. In one embodiment, the validity period can be set for two super frames although other settings can be employed.

FIGS. 4-8, illustrate tune-away processes and protocols for wireless signal processing. While, for purposes of simplicity of explanation, the methodologies are shown and described as a series or number of acts, it is to be understood and appreciated that the processes described herein are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject methodologies disclosed herein.

Figure 4:
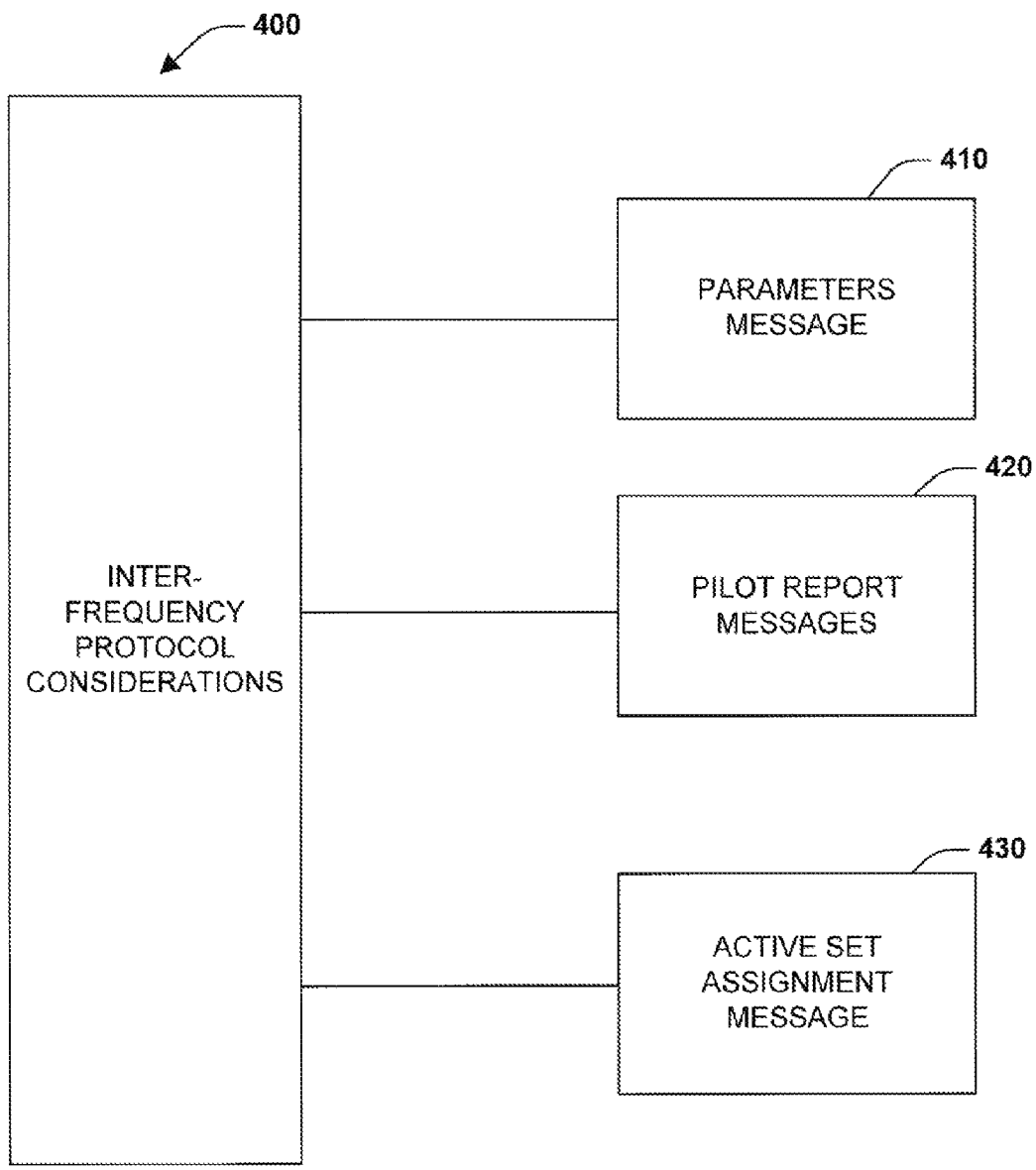
FIG. 4 is a diagram illustrating inter-frequency protocol considerations.

FIG. 4 illustrates one or more inter-frequency protocol considerations 400 for automated tune-away procedures and handoff between frequencies or technologies. The considerations 400 can include one or more message parameters 410. Such parameters can include message data, sector data, local data, registration data, channel data, pilot strength data, and so forth.

Proceeding to 420, an active set management protocol includes a pilot report message. This message can be employed to operate channels and add pilots from other frequencies such as via the channel fields in the above table. At 430, active set assignments can be provided. In some case, same frequency pilots can be specified in the active set whereas other cases differing pilot frequencies can be specified for the active set.

Figure 5:
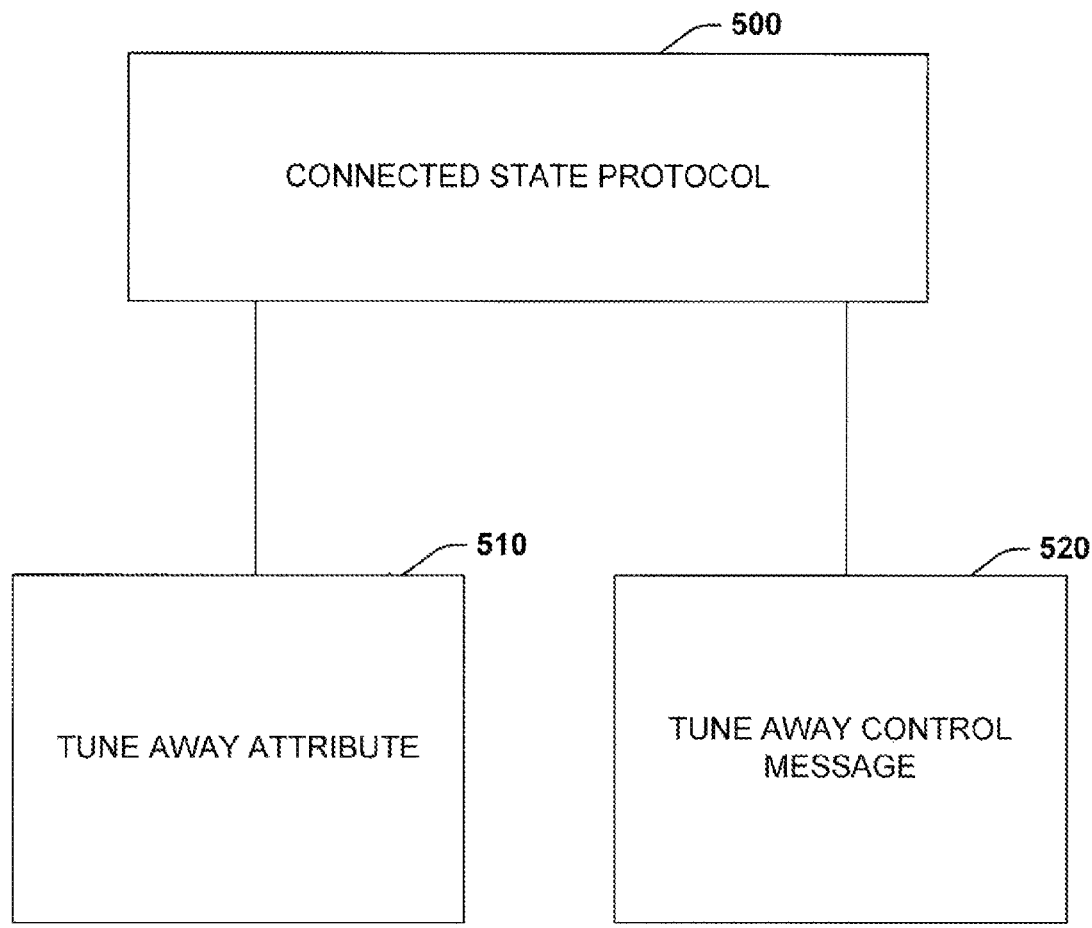
FIG. 5 is a diagram illustrates a connected state protocol for tune-away determinations.

FIG. 5 illustrates a connected state protocol 500 for a tune-away component. The connected state protocol 500 includes a Tune Away attribute 510 that provides a tune-away schedule. A Tune Away Control message 520 enables or disables tune-away mechanisms, provides time correction to a tune-away schedule, and/or can be employed for Asynchronous Sectors.

The tune away attribute can include parameters from the following table:

| Field | Length (bits) | Default |
|---|---|---|
| Length | 8 | N/A |
| AttributeID | 8 | N/A |
| StartSuperframeNumber | 34 | 0 |
| StartSuperframeOffset | 16 | 0 |
| TuneAwayDuration | 22 | 0 |
| TuneAwayPeriod | 24 | 0 | where:
| | |
|---|---|
| Length | Length of the complex attribute in octets. The sender shall set this field to the length of the complex attribute excluding the Length field. |
| AttributeID | The sender shall set this field to 0x01. |
| StartSuperframeNumber | To compute the tune-away cycles, it shall be assumed that the first tune-away occurred in this super frame. |
| StartSuperframeOffset | This field is a measure of time in units of 1 micro seconds. To compute the tune away cycles, it shall be assumed that the first tune-away begins StartSuperframeOffset time after the beginning of super frame number StartSuperframeNumber. |
| TuneAwayDuration | This field determines the duration of the tune away in units of 1 micro seconds. |
| TuneAwayPeriod | This field determines the time between the start of successive tune-aways in units of 1 microseconds. |

The tune away control message 520 can include the following information:

| Field | Length (bits) |
|---|---|
| MessageID | 8 |
| TuneAwayEnabled | 1 |
| NumPilots | 2 |
| NumPilots instances of the following field | |
| ActiveSetIndex | 2 |
| SectorTimeOffset | 24 | where:
| | |
|---|---|
| MessageID | This field can be set to 0x04. |
| TuneAwayEnabled | This field shall be set to '1' if the terminal will tune away at periodic intervals. This field shall be set to '0' if the terminal will not tune away. |
| NumPilots | This field shall be set to the number of pilots included in the message. |
| ActiveSetIndex | This field shall be used to identify Active Set members, as indexed in the ActiveSetAssignment message of the Active Set Management Protocol. |
| SectorTimeOffset | This field shall be set to the time, in units of 1 microsecond, that the terminal adds to the StartSuperframeOffset attribute when this Active Set member is the serving sector. |

Figure 6:
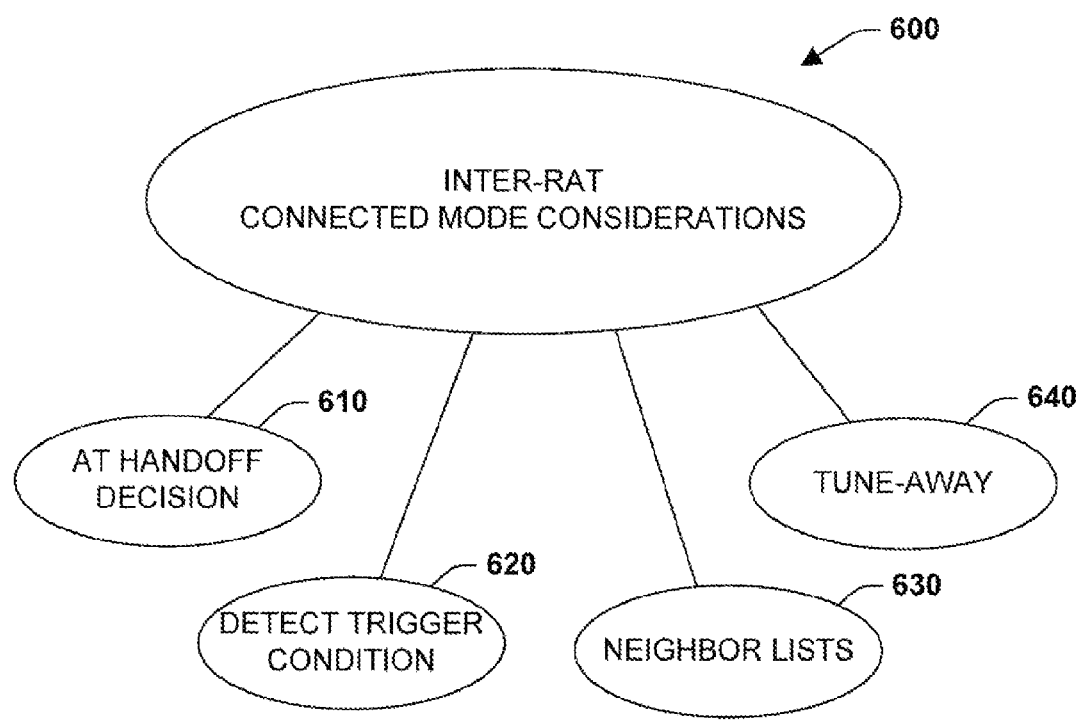
FIG. 6 is a diagram illustrating connected mode considerations for inter-radio access technology handoff and tune-away.

FIG. 6 illustrates one or more inter radio access technology considerations 600 for connected mode. At 610, an access terminal makes a handoff decision between one technology and a subsequent one. A Handoff Policy is generally implemented at the access terminal, whereas the access node may assist in the Handoff process. This can include providing other RAT Neighbor Lists (e.g. Level 1/Level 2 systems) and facilitating tune-away detection processes. At 620, the access terminal detects a trigger condition such as detecting that signal quality on a current channel is below a pre-determined threshold. To start measuring the other technology a command can be sent to measure a Current Active Set Pilot Strength which can include other triggers as well. To handoff to the other technology, the Current Active Set Pilot Strength is determined, another RAT Pilot Strength is determined, and any other trigger employed to enable the handoff. At 630, one or more other RAT Neighbor Lists may be employed. This can include processing an Overhead Message Protocol, a Sector Parameters Message, or other RAT neighbor lists as described above. At 640, a tune-away procedure can be automatically initiated to measure other Frequency Pilots which is similar in nature to the Inter-Frequency Handoff procedures described above.

FIG. 7 is a diagram illustrating an example protocol 700 for inter-radio access technology determinations. Similar to inter-frequency protocols and parameters described above. The protocol 700 is includes various parameters for determining alternative communications channels in accordance with a tune away procedure. As illustrated, the protocol 700 can include a plurality of parameters such as message parameters, country code parameters, sector parameters, subnet mask parameters, latitude parameters, longitude parameters, registration parameters, time and year parameters, and synchronous or asynchronous timing parameters. Other parameters include channel parameters, pilot parameters, power parameters, and technology parameters such as a technology type and technology neighbor list specifications.

Figure 8:
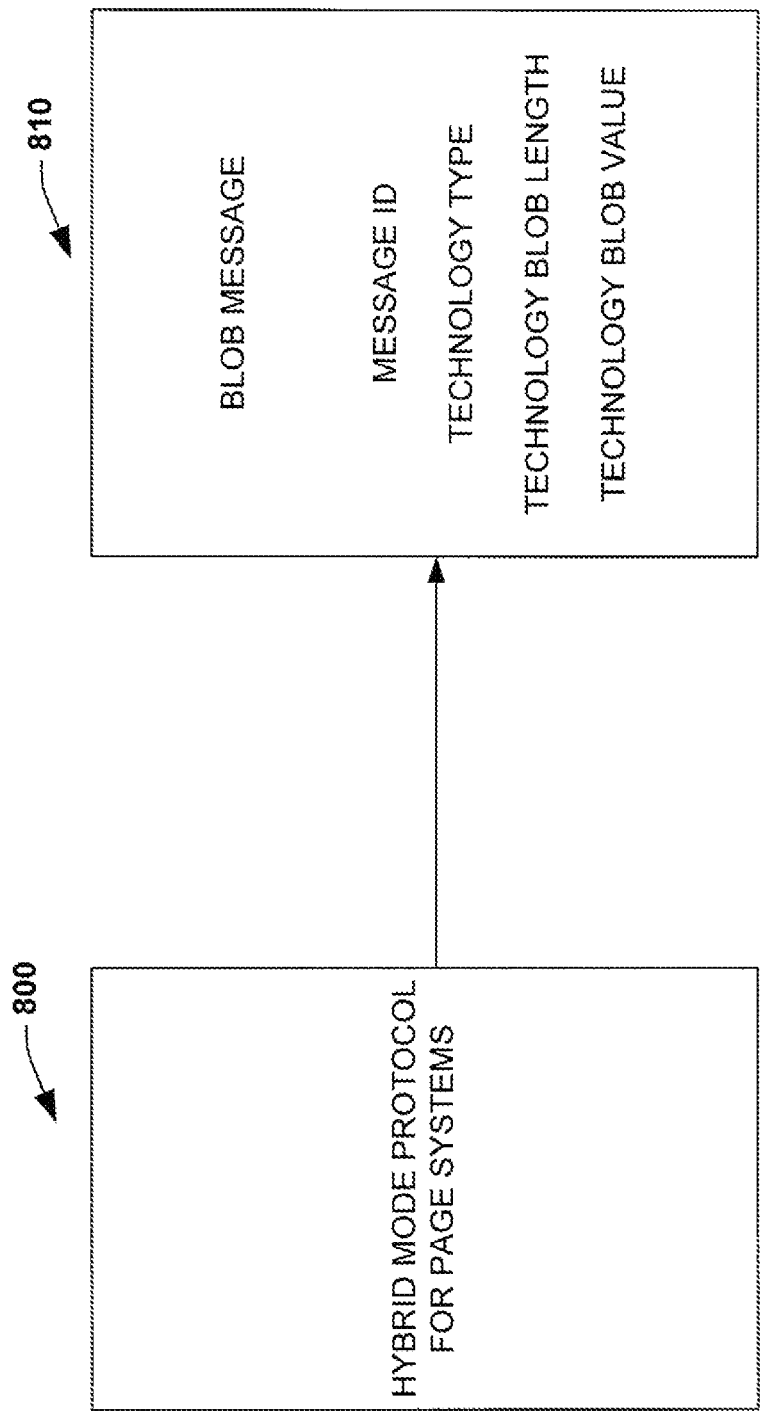
FIG. 8 illustrates a hybrid mode protocol for paging systems.

FIG. 8 illustrates a hybrid mode protocol 800 for paging systems that employ automated tune-away processes. In this embodiment, pages are received for other radio access technologies (RAT). This can include concurrent registration one frequency versus some other technology. Systems may be synchronous or asynchronous to a given system.

The hybrid protocol 800 enables tune away to listen for Pages that may have been sent to a user or system. This includes employment of the Tune Away mechanisms described above.

This may also include a Cross Registration component for Paging systems in order to communicate technology and protocol information. Also, support mechanisms can be provided to send/receive other system BLOBs (binary large objects). This can be useful for Registration or Paging messaging aspects. Other features include a New Session Layer Protocol, an Inter RAT Protocol, an InterRATBlob message, and/or an access terminal or an access node used to send other RAT messages. The access network or access terminal sends the following blob message 820 when it has another RAT message to send.

| Field | Length (bits) |
|---|---|
| MessageID | 8 |
| TechnologyType | 8 |
| TechnologyBlobLength | 8 |
| TechnologyBlobValue | 8 x Technology Length | where:
| | |
|---|---|
| MessageID | This field can be set to 0x00. |
| TechnologyType | This field shall be set to the type of technology, and can be interpreted as follows: |
| TechnologyBlobLength | This field shall be set to the length, in bytes, of the BLOB information for the other technology |
| TechnologyBlobValue | This field shall be set to the BLOB information for the other technology. |

Figure 9:
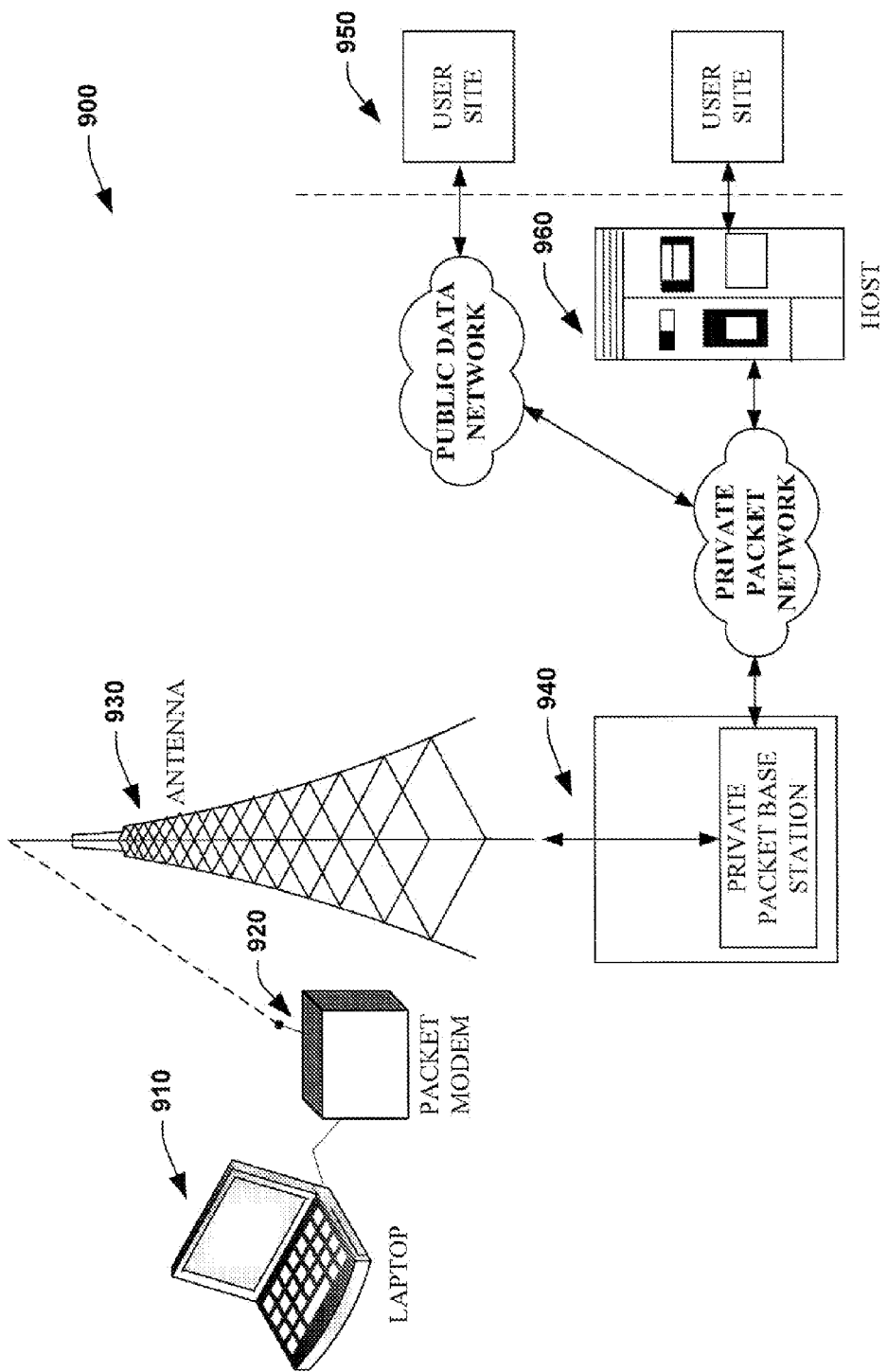
FIG. 9 illustrates an example system for employing signal processing components.

FIG. 9 illustrates an example system 900 for employing wireless signal processing components. The system 900 illustrates some of the various example components that may employ the tune-away components described above. These can include a personal computer 910, a modem 920 that collectively communicate over an antenna 930. Communications may proceed through a base station 940 that communicates over private or public networks to one or more user sites 950 (or devices). Also, one or more host computers 960 may be employed to facilitate communications with the other respective components in the system 900. The system 900 can employ various standards and protocols to facilitate communications.

Figure 10:
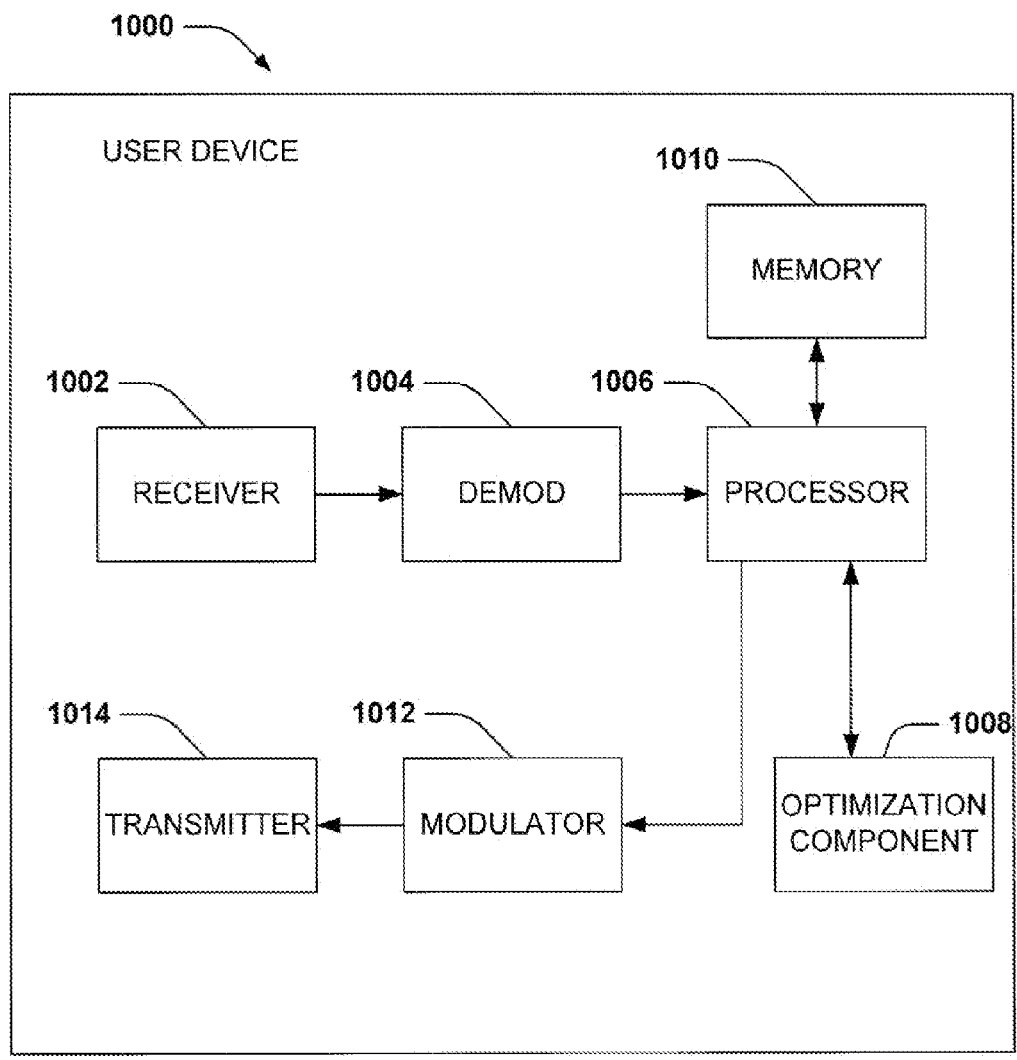
FIGS. 10 and 11 illustrate exemplary wireless communications systems that can be employed with the signal processing components.

FIG. 10 illustrates a system 1000 that can be utilized in connection with a tune-away. System 1000 comprises a receiver 1002 that receives a signal from, for instance, one or more receive antennas, and performs typical actions thereon (e.g., filters, amplifies, downconverts, . . . ) the received signal and digitizes the conditioned signal to obtain samples. A demodulator 1004 can demodulate and provide received pilot symbols to a processor 1006 for channel estimation.

Processor 1006 can be a processor dedicated to analyzing information received by receiver component 1002 and/or generating information for transmission by a transmitter 1014. Processor 1006 can be a processor that controls one or more portions of system 1000, and/or a processor that analyzes information received by receiver 1002, generates information for transmission by a transmitter 1014, and controls one or more portions of system 1000. System 1000 can include an optimization component 1008 that can optimize allocation of resources during a tune-away. Optimization component 1008 may be incorporated into the processor 1006. It is to be appreciated that optimization component 1008 can include optimization code that performs utility based analysis in connection with assigning user devices to beams. The optimization code can utilize artificial intelligence based methods in connection with performing inference and/or probabilistic determinations and/or statistical-based determination in connection with optimizing user device beam assignments.

System (user device) 1000 can additionally comprise memory 1010 that is operatively coupled to processor 1006 and that stores information such as assignment information, scheduling information, and the like, wherein such information can be employed with allocating resources during a tune-away procedure. Memory 1010 can additionally store protocols associated with generating lookup tables, etc., such that system 1000 can employ stored protocols and/or algorithms to increase system capacity. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1010 of the subject systems and methods is intended to comprise, without being limited to, these and any other suitable types of memory. The processor 1006 is connected to a symbol modulator 1012 and transmitter 1014 that transmits the modulated signal.

Figure 11:
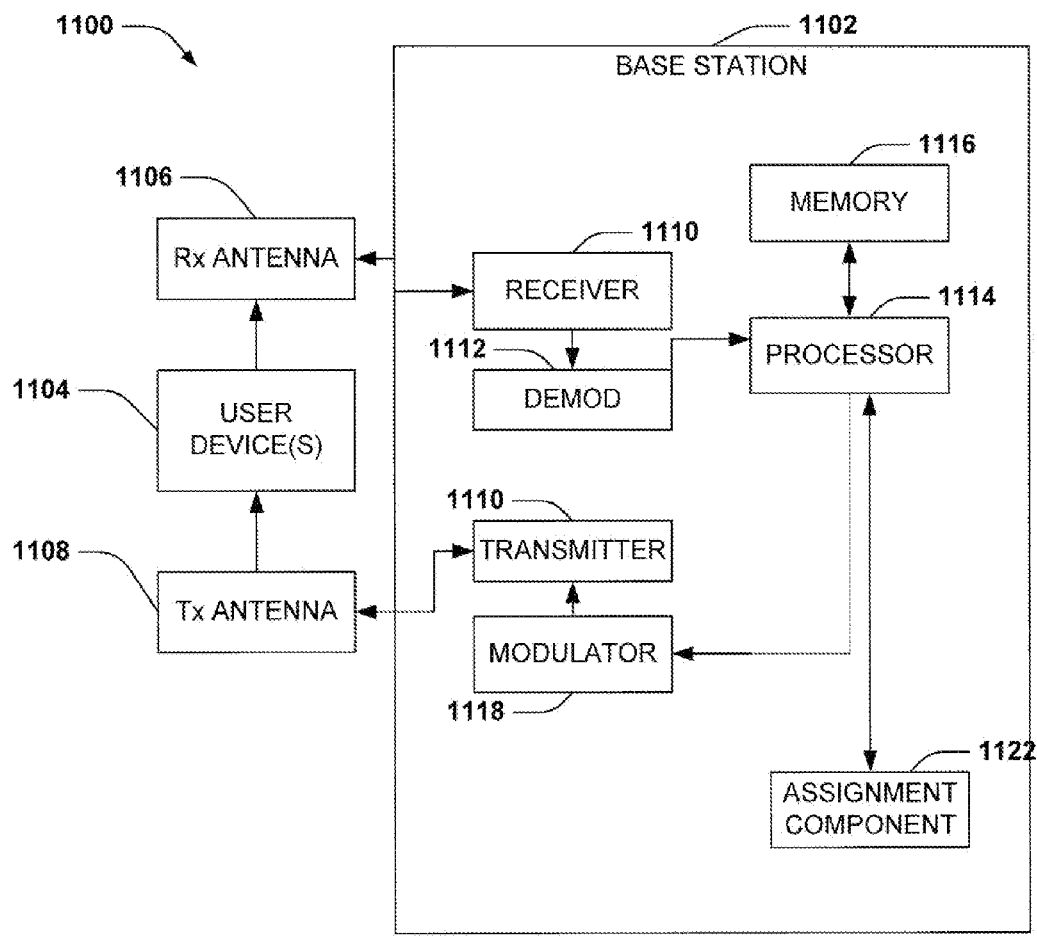

FIG. 11 illustrates a system that may be utilized in connection with performing a tune-away and/or allocating resources during a tune-away. System 1100 comprises a base station 1102 with a receiver 1110 that receives signal(s) from one or more user devices 1104 via one or more receive antennas 1106, and transmits to the one or more user devices 1104 through a plurality of transmit antennas 1108. In one example, receive antennas 1106 and transmit antennas 1108 can be implemented using a single set of antennas. Receiver 1110 can receive information from receive antennas 1106 and is operatively associated with a demodulator 1112 that demodulates received information. Receiver 1110 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. For instance, multiple receivers can be employed (e.g., one per receive antenna), and such receivers can communicate with each other to provide improved estimates of user data. Demodulated symbols are analyzed by a processor 1114 that is similar to the processor described above with regard to FIG. 10, and is coupled to a memory 1116 that stores information related to user device assignments, lookup tables related thereto and the like. Receiver output for each antenna can be jointly processed by receiver 1110 and/or processor 1114. A modulator 1118 can multiplex the signal for transmission by a transmitter 1120 through transmit antennas 1108 to user devices 1104.

Figure 12:
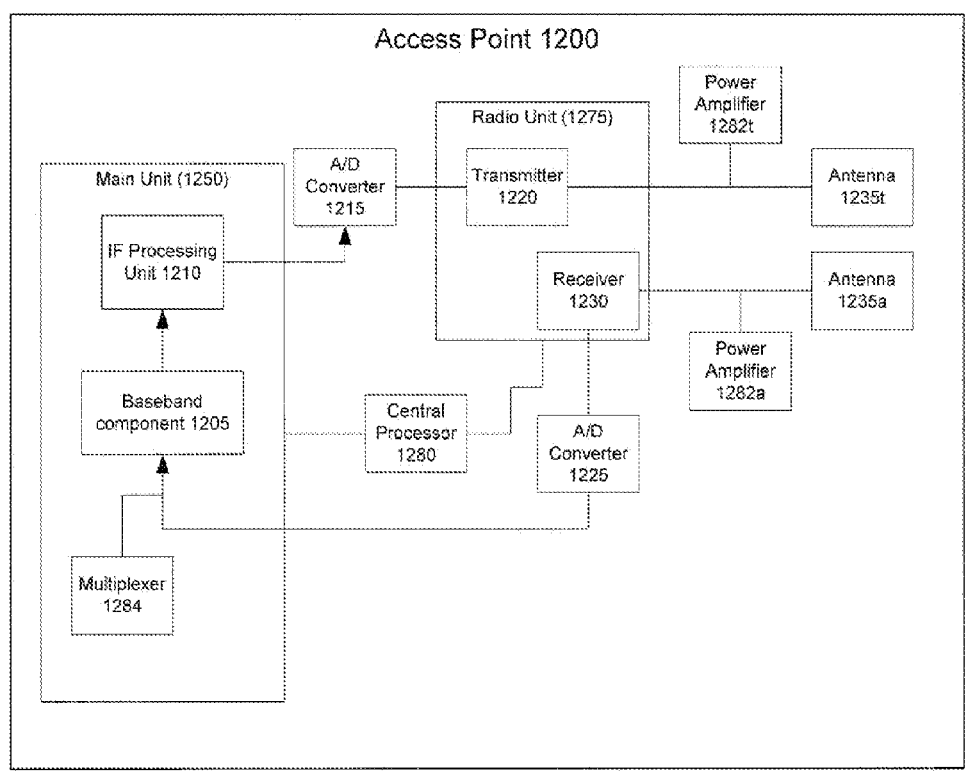
FIG. 12 is an illustration of an access point system.

As shown in FIG. 12, a radio access point can comprise a main unit (MU) 1250 and a radio unit (RU) 1275. MU 1250 includes the digital baseband components of an access point. For example, MU 1250 can include a baseband component

1205 and a digital intermediate frequency (IF) processing unit 1210. Digital IF processing unit 1210 digitally processes radio channel data at an intermediate frequency by performing such functions as filtering, channelizing, modulation, and so forth. RU 1275 includes the analog radio parts of the access point. As used herein, a radio unit is the analog radio parts of an access point or other type of transceiver station with direct or indirect connection to a mobile switching center or corresponding device. A radio unit typically serves a particular sector in a communication system. For example, RU 1275 can include one or more receivers 1230 connected to one more antennas 1235*a-t* for receiving radio communications from mobile subscriber units. In an aspect, one or more power amplifiers 1282 *a-t* are coupled to one or more antennas 1235 *a-t*. Connected to receiver 1230 is an analog-to-digital (A/D) converter 1225. A/D converter 1225 converts the analog radio communications received by receiver 1230 into digital input for transmission to baseband component 1205 via digital IF processing unit 1210. RU 1275 can also include one or more transmitter 1220 connected to either the same or different antenna 1235 for transmitting radio communications to access terminals. Connected to transmitter 1220 is a digital-to-analog (D/A) converter 1215. D/A converter 115 converts the digital communications received from baseband component 1205 via digital IF processing unit 1210 into analog output for transmission to the mobile subscriber units. In some embodiments, a multiplexer 1284 for multiplexing of multiple-channel signals and multiplexing of a variety of signals including a voice signal and a data signal. A central processor 180 is coupled to main unit 1250 and Radio Unit for controlling various processing which includes the processing of voice or data signal.

It is to be understood that the embodiments described herein may be implemented by hardware, software, firmware, middleware, microcode, or any combination thereof. For a hardware implementation, the processing units within an access point or an access terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

What has been described above includes exemplary embodiments. It is, of course, not possible to describe every conceivable combination of components or methodologies for purposes of describing the embodiments, but one of ordinary skill in the art may recognize that many further combinations and permutations are possible. Accordingly, these embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method to process wireless signal components for a mobile wireless access broadband service, comprising:
    invoking a tune-away component to determine an alternative wireless communications path from at least one of inter-frequency and inter-RAT (radio access technology) communication paths;
    receiving a BLOB (binary large object) message from an access node;
    wherein the BLOB message facilitates monitoring a page from a disparate radio access technology (RAT) in a mobile broadband wireless access system;
    wherein the BLOB message comprises a technology type field indicating the type of the disparate radio access technology;
    configuring one or more tune-away parameters associated with a tune-away schedule utilized, the one or more tune-away parameters including at least a start frame number identifying a frame in which a first tune-away occurred and a start frame offset indicating a time duration between a beginning of the start frame and the first-tune away; and
    selecting the alternative wireless communications path based at least in part on the tune-away component and at least one of the one or more tune-away parameters.

2. The method of claim 1, wherein a protocol is employed with at least one of an inter-frequency protocol, an inter-radio access technology protocol, or a hybrid communications protocol.

3. The method of claim 1, further comprising providing a parameter for initiating a signal strength measurement.

4. The method of claim 1, wherein a protocol includes at least one of a tune-away attribute or a tune-away control message.

5. An apparatus to process wireless signal components for a mobile wireless access broadband service, comprising:
    means for invoking a tune-away component to determine an alternative wireless communications path from at least one of inter-frequency and inter-RAT (radio access technology) communication paths;
    means for receiving a BLOB (binary large object) message from an access node;
    wherein the BLOB message facilitates monitoring a page from a disparate radio access technology (RAT) in a mobile broadband wireless access;
    wherein the BLOB message facilitates monitoring a page from a disparate radio access technology (RAT) in a mobile broadband wireless access;
    means for configuring one or more tune-away parameters associated with a tune-away schedule utilized, the one or more tune-away parameters including at least a start frame number identifying a frame in which a first tune-away occurred and a start frame offset indicating a time duration between a beginning of the start frame and the first-tune away; and means for selecting the alternative wireless communications path based at least in part on the tune-away component and at least one of the one or more tune-away parameters.

6. The apparatus of claim 5, wherein a protocol is employed with at least one of an inter-frequency protocol, an inter-radio access technology protocol, or a hybrid communications protocol.

7. The apparatus of claim 5, further comprising providing a parameter for initiating a signal strength measurement.

8. The apparatus of claim 5, wherein a protocol includes at least one of a tune-away attribute or a tune-away control message.

9. A non-transitory computer-readable medium having stored thereon computer-executable code, the computer-executable code comprising:

code for invoking a tune-away component to determine an alternative wireless communications path from at least one of inter-frequency and inter-RAT (radio access technology) communication paths;

code for receiving a BLOB (binary large object) message from an access node;

wherein the BLOB message facilitates monitoring a page from a disparate radio access technology (RAT) in a mobile broadband wireless access system;

wherein the BLOB message comprises a technology type field indicating the type of the disparate radio access technology;

code for configuring one or more tune-away parameters associated with a tune-away schedule utilized, the one or more tune-away parameters including at least a start frame number identifying a frame in which a first tune-away occurred and a start frame offset indicating a time duration between a beginning of the start frame and the first-tune away; and code for selecting the alternative wireless communications path based at least in part on the tune-away component and at least one of the one or more tune-away parameters.

10. The non-transitory computer-readable medium of claim 9, wherein a protocol is employed with at least one of an inter-frequency protocol, an inter-radio access technology protocol, or a hybrid communications protocol.

11. The non-transitory computer-readable medium of claim 9, further comprising providing a parameter for initiating a signal strength measurement.

12. The non-transitory computer-readable medium of claim 9, wherein a protocol includes at least one of a tune-away attribute or a tune-away control message.

13. An apparatus configured to process wireless signal components for a mobile wireless access broadband service, comprising:

a processor configured to:

invoke a tune-away component to determine an alternative wireless communications path from at least one of inter-frequency and inter-RAT (radio access technology) communication paths;

receive a BLOB (binary large object) message from an access node;

wherein the BLOB message facilitates monitoring a page from a disparate radio access technology (RAT) in a mobile broadband wireless access system;

wherein the BLOB message comprises a technology type field indicating the type of the disparate radio access technology;

configure one or more tune-away parameters associated with a tune-away schedule utilized, the one or more tune-away parameters including at least a start frame number identifying a frame in which a first tune-away occurred and a start frame offset indicating a time duration between a beginning of the start frame and the first-tune away; and select the alternative wireless communications path based at least in part on the tune-away component and at least one of the one or more tune-away parameters; and a memory coupled to the processor for storing data.

* * * * *